US010428891B2

United States Patent
Koba (10) Patent No.: US 10,428,891 B2
(45) Date of Patent: Oct. 1, 2019

(54) VIBRATION ISOLATION DEVICE

(71) Applicant: TOYO TIRE & RUBBER CO., LTD., Osaka-shi, Osaka (JP)

(72) Inventor: Hiroto Koba, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 78 days.

(21) Appl. No.: 15/350,246

(22) Filed: Nov. 14, 2016

(65) Prior Publication Data

US 2017/0146086 A1     May 25, 2017

(30) Foreign Application Priority Data

Nov. 20, 2015   (JP) .................................. 2015-227402

(51) Int. Cl.
*F16F 1/38*     (2006.01)

(52) U.S. Cl.
CPC .............. *F16F 1/3828* (2013.01); *F16F 1/38* (2013.01); *F16F 1/3814* (2013.01); *F16F 1/3842* (2013.01)

(58) Field of Classification Search
CPC .......... F16F 1/38; F16F 1/3814; F16F 1/3828; F16F 1/3842
See application file for complete search history.

(56) References Cited

U.S. PATENT DOCUMENTS

| 2,781,990 A | 2/1957 | Via |
| 3,230,000 A * | 1/1966 | Simpson ................. B25B 27/28 267/270 |
| 3,383,143 A | 5/1968 | Schmidt |
| 4,531,761 A | 7/1985 | von Sivers |
| 4,744,677 A | 5/1988 | Tanaka et al. |
| 4,771,990 A * | 9/1988 | Domer .................... F16F 13/14 267/140.12 |
| 4,809,960 A | 3/1989 | Kakimoto et al. |
| 5,058,867 A | 10/1991 | Hadano et al. |

(Continued)

FOREIGN PATENT DOCUMENTS

| JP | 2002-188671 A | 7/2002 |
| JP | 2002-295560 A | 10/2002 |

OTHER PUBLICATIONS

Final Office Action dated Apr. 18, 2018, issued in U.S. Appl. No. 15/350,732 (10 pages).

(Continued)

*Primary Examiner* — Bradley T King
(74) *Attorney, Agent, or Firm* — Westerman, Hattori, Daniels & Adrian, LLP (57) ABSTRACT

The present invention has an object to provide a vibration isolation device in which stress added to an adhesion layer of a vibration isolation body at enlargement of an inner pipe can be made small and a spring constant in an axis direction can be increased.
A vibration isolation body which is enlarged as going toward a first end surface of an inner pipe and an enlarged portion with non-adhesion state are formed in the inner pipe. A flection portion bent toward an outer side in a radial direction by bending an end portion in the axis direction at a side of the enlarged portion in an outer pipe is formed in the outer pipe. A stopper portion protruded toward the enlarged portion from a clearance between the inner pipe and the outer pipe and the flection portion is formed in the vibration isolation body.

14 Claims, 4 Drawing Sheets

(56) References Cited

U.S. PATENT DOCUMENTS

| | | | |
|---|---|---|---|
| 5,062,654 A | 11/1991 | Kakimoto et al. | |
| 5,143,457 A | 9/1992 | Langhof et al. | |
| 5,261,748 A | 11/1993 | Kameda | |
| 5,301,414 A * | 4/1994 | Gautheron | B21J 9/025 |
| | | | 29/446 |
| 5,328,160 A | 7/1994 | McLaughlin | |
| 5,352,044 A | 10/1994 | Jordens et al. | |
| 5,439,242 A | 8/1995 | Zivkovic | |
| 5,503,376 A | 4/1996 | Simuttis et al. | |
| 5,820,115 A | 10/1998 | Stevenson et al. | |
| 5,941,511 A | 8/1999 | Dawda et al. | |
| 5,954,350 A | 9/1999 | Santo et al. | |
| 6,017,073 A | 1/2000 | Lindblom et al. | |
| 6,164,405 A | 12/2000 | Sakata | |
| 6,398,200 B1 | 6/2002 | Kakimoto et al. | |
| 6,651,965 B1 * | 11/2003 | Vossel | F16F 13/14 |
| | | | 267/140.12 |
| 6,666,438 B2 | 12/2003 | Nakagawa | |
| 6,767,020 B2 | 7/2004 | Yamamoto et al. | |
| 6,893,010 B2 | 5/2005 | Groth et al. | |
| 7,506,862 B2 | 3/2009 | Siemer et al. | |
| 7,722,018 B2 | 5/2010 | Meyerboeck et al. | |
| 8,777,196 B2 | 7/2014 | Kumper | |
| 8,882,092 B2 | 11/2014 | Jang | |
| 2002/0043749 A1 | 4/2002 | Hokazono et al. | |
| 2002/0140146 A1 | 10/2002 | Nakagawa | |
| 2002/0141669 A1 | 10/2002 | Testroet | |
| 2003/0079311 A1 | 5/2003 | Yamamoto et al. | |
| 2003/0090045 A1 | 5/2003 | Groth et al. | |
| 2004/0011103 A1 | 1/2004 | Takahashi et al. | |
| 2005/0138787 A1 | 6/2005 | Katoh et al. | |
| 2006/0290040 A1 | 12/2006 | Kumper | |
| 2008/0079205 A1 * | 4/2008 | Hayashi | F16F 1/3828 |
| | | | 267/140.13 |
| 2009/0179362 A1 * | 7/2009 | Ebert | F16F 1/3828 |
| | | | 267/293 |
| 2015/0113797 A1 | 4/2015 | Cha | |
| 2017/0146087 A1 * | 5/2017 | Koba | F16F 1/38 |

OTHER PUBLICATIONS

Non-Final Office Action dated Oct. 4, 2017, issued in U.S. Appl. No. 15/350,732. (14 pages).
Non-Final Office Action dated Oct. 2, 2018, issued in U.S. Appl. No. 15/350,732 (10 pages).
Office Action dated Jun. 28, 2018, issued in counterpart Chinese Application No. 201611029931.X, with English translation. (12 pages).
Office Action dated Jun. 28, 2018, issued in counterpart Chinese Application No. 201611029978.6, with English translation. (12 pages).
Final Office Action dated May 1, 2019, issued in U.S. Appl. No. 15/350,732. (14 pages).
Office Action dated Mar. 1, 2019, issued in CN Application No. 201611029931.X, with English transaltion. (7 pages).
Office Action dated Jul. 16, 2019, issued in counterpart JP application No. 2015-227410, with English translation. (9 pages).
Office Action dated Jul. 2, 2019, issued in counterpart JP application No. 2015-227402, with English translation. (9 pages).

* cited by examiner

VIBRATION ISOLATION DEVICE

TECHNICAL FILED

The present invention relates to a vibration isolation device through which stress added to an adhesion layer of a vibration isolation body when a diameter of inner pipe is enlarged can be lowered and a spring constant along an axis direction can be increased.

BACKGROUND ART

In a suspension device of a car, a bush (vibration isolation device) connecting an inner pipe and an outer pipe by a vibration isolation body made of rubber elastic body is arranged between a car body and a member of vibration side. Conventionally, as the vibration isolation device, it is proposed the vibration isolation device in which an enlarged portion in a radial direction is formed by enlarging an end along an axis direction of the inner pipe under a state that the inner pipe and the outer pipe are connected through the vibration isolation body formed by vulcanization-bond. Thereby, an end area of the inner pipe can be secured (Patent Literature 1).

CITATION LIST

Patent Literature

Patent Literature 1: Japanese Patent Application Laid Open No. 2002-188671

SUMMARY OF INVENTION

Technical Problem

However, in the Patent Literature 1, since the enlarged portion and the vibration isolation body are mutually connected by vulcanization-bond, the stress acts on the adhesion layer of the vibration isolation body when the enlarged portion is formed by enlarging the diameter of the inner pipe. Further, in the Patent Literature 1, there is a problem that the spring constant along the axis direction cannot be sufficiently secured.

The present invention has been made in taking above problems into consideration and has an object to provide a vibration isolation device in which the stress added to the adhesion layer of the vibration isolation body can be lowered when the inner pipe is enlarged and the spring constant along the axis direction can be increased.

Solution to Problem and Advantageous Effects of Invention

In order to accomplish the above object, according to the vibration isolation device of the first aspect of embodiments, the inner pipe and the outer pipe arranged at the outer side of the radial direction of the inner pipe with a distance therebetween are mutually connected through the vibration isolation body composed of the rubber elastic body. Here, the both end surfaces along an axis direction of the inner pipe respectively become the first end surface and the second end surface and the enlarged portion formed by enlarging the diameter of the inner pipe in a tapered shape toward the first end surface is formed in the inner pipe. When the enlarged portion is formed in the inner pipe by enlarging the first end surface side of the inner pipe under a state that the inner pipe and the outer pipe are mutually connected through the vibration isolation body, there is an effect that the stress acting on the adhesion layer of the vibration isolation body when the inner pipe is enlarged can be lowered since the enlarged portion and the vibration isolation body are not adhered.

A flection portion is formed in the outer pipe by bending an end portion in the axis direction of the enlarged portion side in the outer pipe toward the outer side in the radial direction and a stopper portion protruded toward the enlarged portion from a clearance between the inner pipe and the outer pipe and the flection portion is formed in the vibration isolation body. Based on that force is added to the stopper portion from the enlarged portion at the first end surface side than the flection portion in the axis direction, relative displacement of the inner pipe and the outer pipe in the axis direction is restrained. Based on that force is added to the stopper portion from the enlarged portion, there is an effect that a spring constant in the axis direction can be increased.

Further, since the stopper portion can be made thick in the radial direction by the flection portion, it can be restrained that the stopper portion to which force is added from an outer peripheral surface in a tapered shape of the enlarged portion is deformed to the outer side in the radial direction. Thereby, there is an effect: it can be restrained that the spring constant in the axis direction is lowered due to that the stopper portion deforms to the outer side in the radial direction.

According to the vibration isolation device of the second aspect of embodiments, since a part of the stopper portion to which force is added from the enlarged portion is positioned at the outer side in the radial direction of the enlarged portion under non-load state, the stopper portion and the enlarged portion can be brought close with each other under the non-load state. As a result, in addition to the effect of the first aspect, there is an effect that a relative displacement quantity of the inner pipe and the outer pipe in the axis direction can be reduced.

According to the vibration isolation device of the third aspect of embodiments, a recess portion formed in the stopper portion, the recess portion being arranged at a position facing an outer peripheral surface of the inner pipe is recessed toward the outer side in the radial direction of the inner pipe. Since the stopper portion to which force is added from the enlarged portion can be made difficult to deform to the outer side in the radial direction based on the recess portion, in addition to the effect of the first aspect, there is an effect: it can be restrained that the spring constant in the axis direction is lowered due to that the stopper portion deforms to the outer side in the radial direction.

According to the vibration isolation device of the fourth aspect of embodiments, at least a part of the recess portion is formed at the first end surface side than the flection portion in the axis direction. The part protruded to the first end surface side than the flection portion in the stopper portion can be made difficult to deform to the outer side in the radial direction by the recess portion. Therefore, in addition to the effect of the third aspect, there is an effect: it can be further restrained that the spring constant in the axis direction is lowered.

According to the vibration isolation device of the fifth aspect of embodiments, since the enlarged portion is superimposed with the outer pipe when seen from the axis direction, in addition to the effect of the first aspect, there is an effect: a relative displacement of the inner pipe and the outer pipe can be surely restrained through the part of the stopper portion where the enlarged portion and the outer pipe are mutually superimposed in the axis direction.

According to the vibration isolation device of the sixth aspect of embodiments, a part of the stopper portion positioned at the outer side in the radial direction than an inner peripheral surface of the outer pipe is defined as an outer side portion, and the outer side portion is enlarged in a tapered shape along the radial direction as the outer peripheral surface is going toward the flection portion. Therefore, force added to the stopper portion from the enlarged portion can be surely received. Thereby, since the stopper portion can be made difficult to deform to the outer side in the radial direction, in addition to the effect of the first aspect, there is an effect: it can be restrained that the spring constant in the axis direction is lowered due to that the stopper portion deforms to the outer side in the radial direction.

According to the vibration isolation device of the seventh aspect of embodiments, since a predetermined space is formed between the inner pipe and the stopper portion under the non-load state, the stopper portion can be permitted to deform to the inner side in the radial direction based on the predetermined space when force is added to the stopper portion from the enlarged portion. Thereby, in addition to the effect of the first aspect, there is an effect: it can be restrained that the spring constant in the axis direction is lowered due to that the stopper portion deforms to the outer side in the radial direction.

According to the vibration isolation device of the eighth aspect of embodiments, a bottom portion corresponding to a bottom at a second end surface side in the predetermined space is positioned at the second end surface side than a surface of the first end surface side of the flection portion in the axis direction. Thereby, the stopper portion at the second end surface side than the surface in the first end surface side of the flection portion in the axis direction and at the inner side in the radial direction than the inner peripheral surface of the outer pipe can be easily deformed based on the predetermined space. Since comparing with the stopper portion at the outer side in the radial direction than the inner peripheral surface of the outer pipe, the stopper portion at the inner side in the radial direction than the inner peripheral surface of the outer pipe can be easily deformed, the stopper portion to which force is added from the enlarged portion can be made difficult to deform to the outer side in the radial direction. As a result, in addition to the effect of the seventh aspect, there is an effect: it can be further restrained that the spring constant in the axis direction is lowered due to that the stopper portion deforms to the outer side in the radial direction.

According to the vibration isolation device of the ninth aspect of embodiments, the stopper portion has a slanted surface corresponding to a surface to which force is added from the enlarged portion and is formed into a shape corresponding to the outer peripheral surface in the axis direction of the enlarged portion. Therefore, pressure receiving area of the stopper portion when force is added to the slanted surface can be secured. Thereby, since the rise in the load-bend curve when load in the axis direction is added to the slanted surface can be made steep, in addition to the effect of the first aspect, there is an effect that the spring constant in the axis direction can be increased.

According to the vibration isolation device of the tenth aspect of embodiments, the enlarged portion has a convex surface formed so that the outer peripheral surface in the axis direction is curved in a convex shape toward the slanted surface, and the slanted surface is curved in a concave shape toward the convex surface. Since force is added to the concave slanted surface from the convex surface formed in the convex shape, the convex surface and the slanted surface can be made difficult to slip off with each other. As a result, in addition to the effect of the ninth aspect, there is an effect: it can be restrained that the spring constant in the axis direction is lowered due to that the convex surface and the slanted surface slip off in the radial direction.

According to the vibration isolation device of the eleventh aspect of embodiments, the enlarged portion has a concave surface formed so that the outer peripheral surface is curved in a concave shape continuous to the second end surface side of the convex surface. A part of the stopper portion is positioned at an inner side in the radial direction than a flection point which is a border of the convex surface and the concave surface. Thereby, when force is added to the stopper portion from the enlarged portion, the concave surface and inner peripheral surface of the stopper portion gradually contact while the stopper portion is deforming according to a shape along the concave surface curved in concave. When the concave surface and the stopper portion contact, since the enlarged portion and the stopper portion can be made difficult to slip off with each other, in addition to the effect of the tenth aspect, there is an effect: it can be further restrained that the spring constant in the axis direction is lowered due to that the enlarged portion and the stopper portion slip off in the radial direction.

According to the vibration isolation device of the twelfth aspect of embodiments, the enlarged portion has a concave surface formed so that the outer peripheral surface is curved in a concave shape continuous to the second end surface side of the convex surface. The stopper portion has a connection surface formed so that the inner peripheral surface is curved in a convex shape continuous to the second end surface side of the slanted surface. A position of the flection point of the convex surface and the concave surface and a position of the flection point of the slanted surface and the connection surface coincide in the radial direction. Therefore, the slanted surface and the convex surface can be very closely contacted. Thereby, since the convex surface and the slanted surface can be made difficult to slip off, in addition to the effect of the tenth aspect, there is an effect: it can be further restrained that the spring constant in the axis direction is lowered due to that the convex surface and the slanted surface slip off in the radial direction.

DESCRIPTION OF EMBODIMENTS

Figure 1:
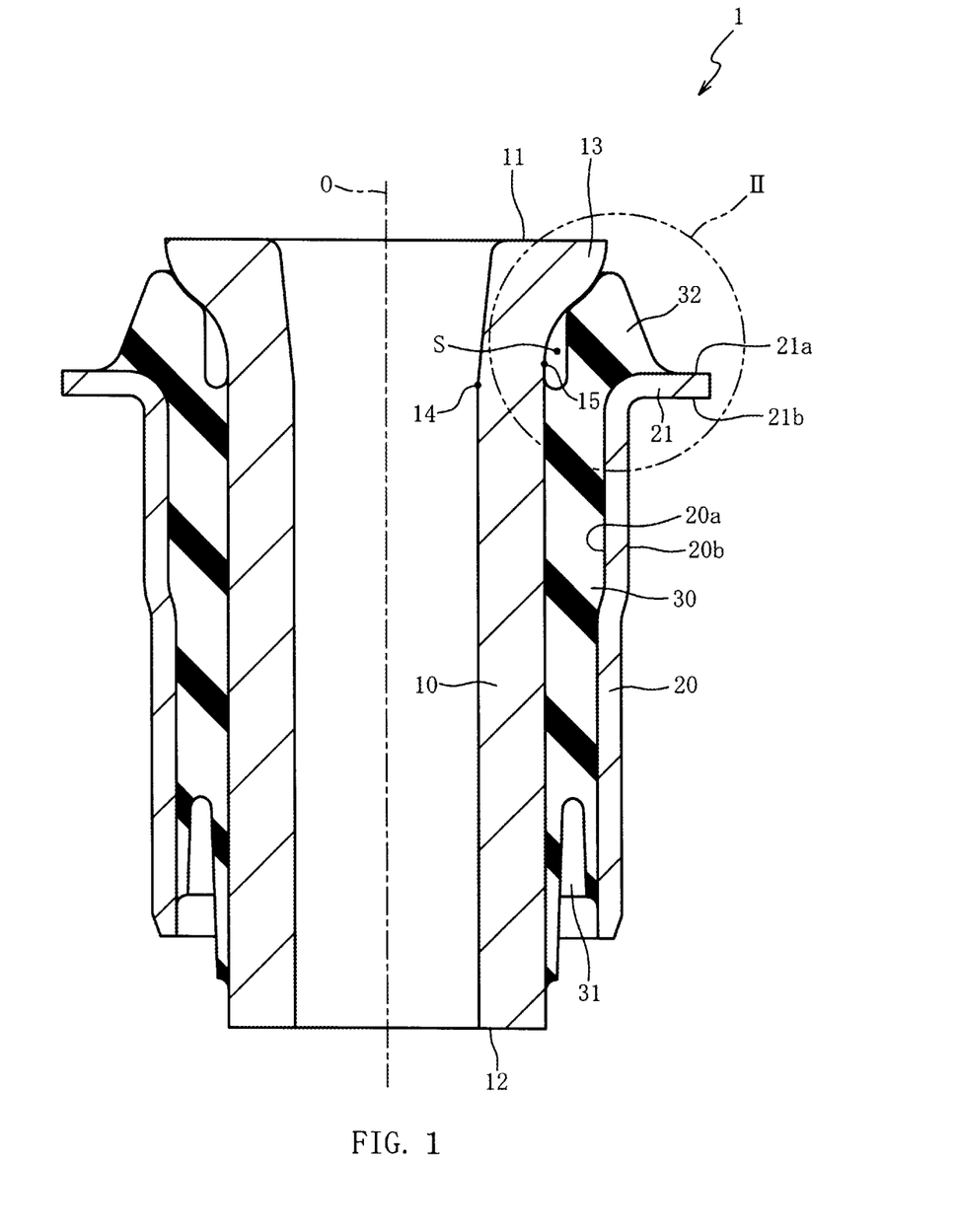
FIG. 1 is a sectional view of the vibration isolation device according to a first embodiment of the present invention.

Hereinafter, preferred embodiments embodying the present invention will be described in detail with reference to drawings. First, with reference to FIG. 1, an outline construction of the vibration isolation device 1 according to a first embodiment of the present invention will be described. FIG. 1 is a sectional view of the vibration isolation device 1 according to the first embodiment of the present invention.

Here, in FIG. 1, it is indicated a sectional view for an axis direction of the vibration isolation device 1 including a central axis O.

As shown in FIG. 1, the vibration isolation device 1 is a bush arranged in a suspension device of a car. The vibration isolation device 1 has an inner pipe 10, an outer pipe 20 coaxially arranged so as to separate from an outer side in a radial direction of the inner pipe 10 with a distance therebetween and a vibration isolation body 30 made of a rubber elastic body, the vibration isolation body 30 mutually connecting the inner pipe 10 and the outer pipe 20. In the vibration isolation device 1, the inner pipe 10 and the outer pipe 20 are respectively connected to different partner members (not shown), thereby the vibration isolation device 1 connects both partner members for vibration isolation.

The inner pipe 10 is a member cylindrically formed from rigid materials such as steel materials or aluminum alloy. In the inner pipe 10, a shaft-like member (not shown) such as a bolt is inserted and the shaft-like member is connected to the partner member (not shown), thereby the inner pipe 10 is attached to the partner member. In the inner pipe 10, an end surface in the axis direction positioned at one side (upper side in FIG. 1) becomes a first end surface 11 and an end surface in the axis direction positioned at the other side (under side in FIG. 1) opposite to the first end surface 11 becomes a second end surface 12. The inner pipe 10 has an enlarged portion 13 along the radial direction which is enlarged in a tapered shape along the radial direction as going to the first end surface 11 (end portion in the axis direction of the inner pipe 10).

The enlarged portion 13 is a portion which is plastically deformed from the first end surface 11 of the inner pipe 10 to a predetermined position. In the enlarged portion 13, an inner peripheral surface and an outer peripheral surface are enlarged in a tapered shape as going to the first end surface 11 and thickness (dimension in the radial direction) is made larger. Since the area of the first end surface 11 can be made large, surface pressure received on the first end surface 11 by fastening to the partner member can be made small. As a result, cave-in of the partner member and buckle of the first end surface 11 side in the inner pipe 10 can be restrained.

The inner peripheral surface of the enlarged portion 13 is slanted while retaining an angle with the central axis O to a substantially constant angle so that the inner surface is separated from the central axis O as going from an inner peripheral staring point 14 toward the first end surface 11. The outer peripheral surface of the enlarged portion 13 is slanted so as to separate from the central axis O as going from an outer peripheral starting point 15 toward the first end surface 11.

The outer pipe 20 is a member made of rigid material such as steel material or aluminum alloy so that the thickness thereof (dimension in the radial direction) becomes a substantially constant in a cylindrical shape. The outer pipe 20 is attached to the partner member (not shown) by press-fitting into the partner member. The outer pipe 20 is formed so that length thereof becomes slightly shorter than that of the inner pipe 10 and a flection portion 21 is formed by bending the axis direction end portion of the first end surface 11 side (side of the enlarged portion 13) at substantially right angle against the central axis O toward the outer side in the radial direction. Here, in the first embodiment, description will be done by defining the surface of the inner pipe 10 side in the portion (portion of the outer pipe 20 except for the flection portion 21) extending to the axis direction of the outer pipe 20 as an inner peripheral surface 20a, the opposite surface to the inner peripheral surface 20a as an outer peripheral surface 20b, the surface continuing to the inner peripheral surface 20a of the flection portion 21 as an axis direction end surface 21a and the surface continuing to the outer peripheral surface 20b of the flection portion 21 as the outer peripheral surface 21b.

The vibration isolation body 30 is a member with a substantially cylindrical shape arranged between the inner pipe 10 and the outer pipe 20, and in the first embodiment, the vibration isolation body 30 is formed by vulcanizing formation of rubber material. In the vibration isolation body 30, the inner peripheral surface thereof is adhered to the second end surface 12 side of the outer peripheral surface of the inner pipe 10 than the outer peripheral starting point 15 by vulcanizing adhesion, and the outer peripheral surface is adhered to the inner peripheral surface 20a of the outer pipe 20 and the axis direction end surface 21a by vulcanizing adhesion. Thereby, the vibration isolation body 30 integrally connects both the inner pipe 10 and the outer pipe 20. Further, since the inner peripheral surface of the vibration isolation body 30 is adhered to the second end surface 12 side of the outer peripheral surface of the inner pipe 10 than the outer peripheral starting point 15, the vibration isolation body 30 and the enlarged portion 13 can be mutually connected by non-adhesion.

In the vibration isolation body 30, it is provided an annular recess 31, which is recessed in the axis direction so as to make one lap in the peripheral direction and formed on the axis direction end surface of the second end surface 12 side, and it is provided an annular stopper portion 32 protruded toward the enlarged portion 13 from the flection portion 21 between the inner pipe 10 and the outer pipe 20. By forming the recess 31, adhesion area among the vibration isolation body 30 and the inner pipe 10, the outer pipe 20 can be retained while lowering the spring constant in the radial direction.

Figure 2:
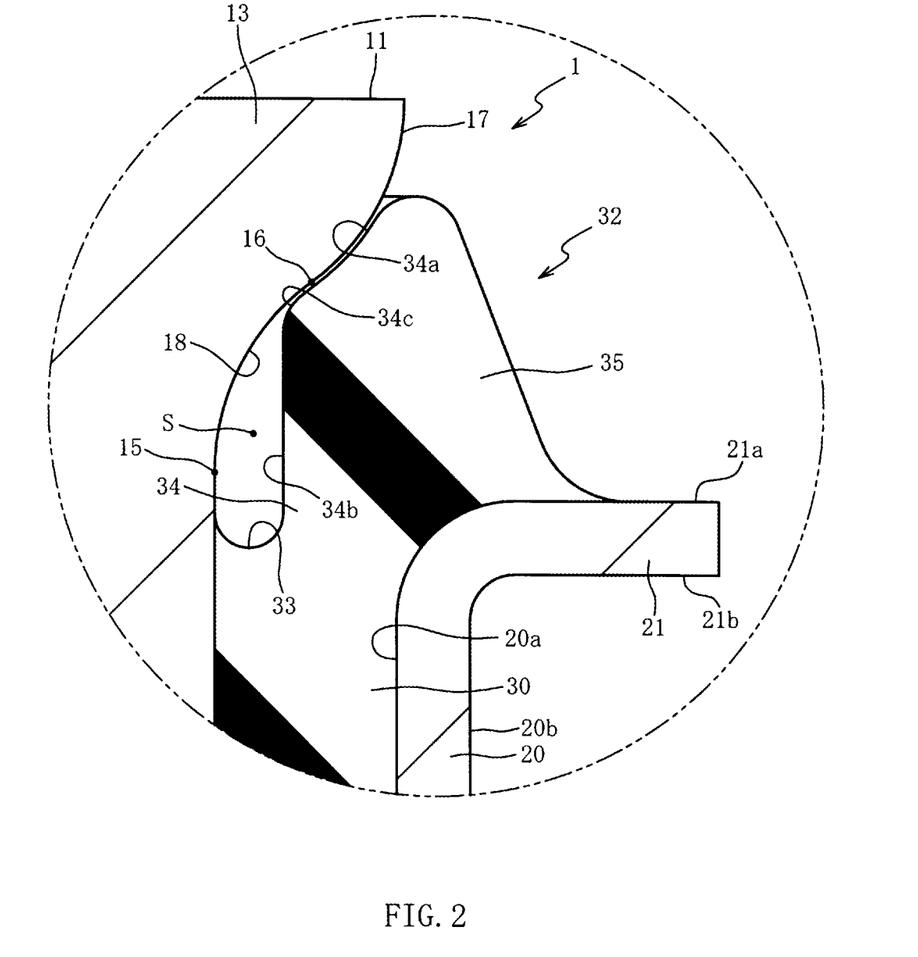
FIG. 2 is a partially enlarged view of the vibration isolation device, in which a part shown by II in FIG. 1 is enlarged and indicated.

Next, with reference to FIG. 2, the detailed construction of the enlarged portion 13 and the stopper portion 32 will be described. FIG. 2 is a partially enlarged view of the vibration isolation device 1, in which a part shown by II in FIG. 1 is enlarged. As shown in FIG. 2, the enlarged portion 13 is protruded in the outer radial direction than the inner peripheral surface 20a of the outer pipe 20. The outer peripheral surface of the enlarged portion 13 is curved so as to have a flection point 16. The outer peripheral surface of the enlarged portion 13 is shaped so that the first end surface 11 side than the flection point 16 is made into an convex surface 17 curved in a convex shape and the second end surface 12 side than the flection point 16 (see FIG. 1) is made into a concave surface 18 curved in a concave shape.

The stopper portion 32 is a part restraining relative deformation in the axis direction of the inner pipe 10 and the outer pipe 20 by force added from the enlarged portion 13. The stopper portion 32 is arranged so that a part of the stopper portion 32 is positioned at an inner side in the radial direction than the flection point 16 and a predetermined space S is formed in a clearance to the inner pipe 10 under a non-load state. A part of end surface of the first end surface 11 side in the vibration isolation body 30, becoming a bottom of the second end surface 12 side in the space S, is defined as a bottom portion 33 of the space S. The bottom portion 33 is positioned at the second end surface 12 side (see FIG. 1) than the axis direction end surface 21a of the flection portion 21 (outer pipe 20) in the axis direction and at first end surface 11 side than the outer peripheral surface 21b of the flection portion 21 (outer pipe 20).

Here, in the first embodiment, a part of the first end surface 11 side than the bottom portion 33 in the axis direction is defined as the stopper portion 32. Further, it will be conceivable that the bottom portion 33 is set so that the bottom portion 33 is positioned at the first end surface 11 side than the axis direction end surface 21a of the flection portion 21. In this case, a part of the first end surface 11 side than the axis direction end surface 21a of the flection portion 21 in the axis direction is defined as the stopper portion 32.

The stopper portion 32 has an inner side portion 34 positioned at the inner side in the radial direction than the inner peripheral surface 20a of the outer pipe 20 and an outer side portion 35 positioned at the outer side in the radial direction than the inner peripheral surface 20a of the outer pipe 20 and positioned in the axis direction of the flection portion 21. The inner side portion 34 is a part protruding toward the enlarged portion 13 in a clearance between the inner pipe 10 and the outer pipe 20. The inner side portion 34 is constructed from a portion the inner peripheral surface of which is parallel with the central axis O and a portion which is enlarged in a tapered shape along the radial direction toward the first end surface 11. The inner surface of the inner side portion 34 has a slanted surface 34a facing the convex surface 17 in the axis direction, a parallel surface 34b parallel with the central axis O (see FIG. 1) of the inner pipe 10 and a connection surface 34c smoothly connecting the slanted surface 34a and the parallel surface 34b.

The slanted surface 34a faces to the convex surface 17 while separating from the convex surface 17 with a substantially constant distance therebetween in the axis direction under the non-load state. The slanted surface 34a is positioned at the outer side of the enlarged portion 13 in the radial direction under the non-load state and is set at the first end surface 11 side than the flection portion 21 in the axis direction. The slanted surface 34a is formed in a shape corresponding to a shape of the convex surface 17, that is, is formed in a curved concave shape toward the convex surface 17. Here, it is not limited to the case that the slanted surface 34a and the convex surface 17 are retained in a non-contact state under the non-load state, further it may be possible that the slanted surface 34a and the concave surface 17 are mutually contacted. In this case, it may be possible that the stopper portion 32 is pre-compressed in the axis direction by the enlarged portion 13.

The parallel surface 34b faces to the inner pipe 10 while providing the space S in a clearance to the outer peripheral surface of the inner pipe 10 under the non-load state. The connection surface 34c faces to the concave surface 18 with a distance therebetween under the non-load state and is formed into a convex curved shape toward the concave surface 18. The connection portion of the slanted surface 34a and the connection surface 34c (flection point) and the position of the flection point 16 substantially coincide with each other in the radial direction. Here, it may be possible that the connection portion of the slanted surface 34a and the connection surface 34c (flection point) and the position of the flection point 16 are mutually shifted.

The outer side portion 35 is a part to thicken the stopper portion 32 in the radial direction and the outer peripheral surface thereof is enlarged in a tapered shape as going toward the flection portion 21. The outer side portion 35 is formed so as to extend to the substantial center portion in the radial direction of the flection portion 21 from the inner side portion 34. Here, the thickness in the radial direction of the stopper portion 32 may be voluntarily changed and when the stopper portion 32 is provided to the top (end of outer side in the radial direction) of the outer side portion 35, the stopper portion 32 becomes thickest in the radial direction.

Figure 3:
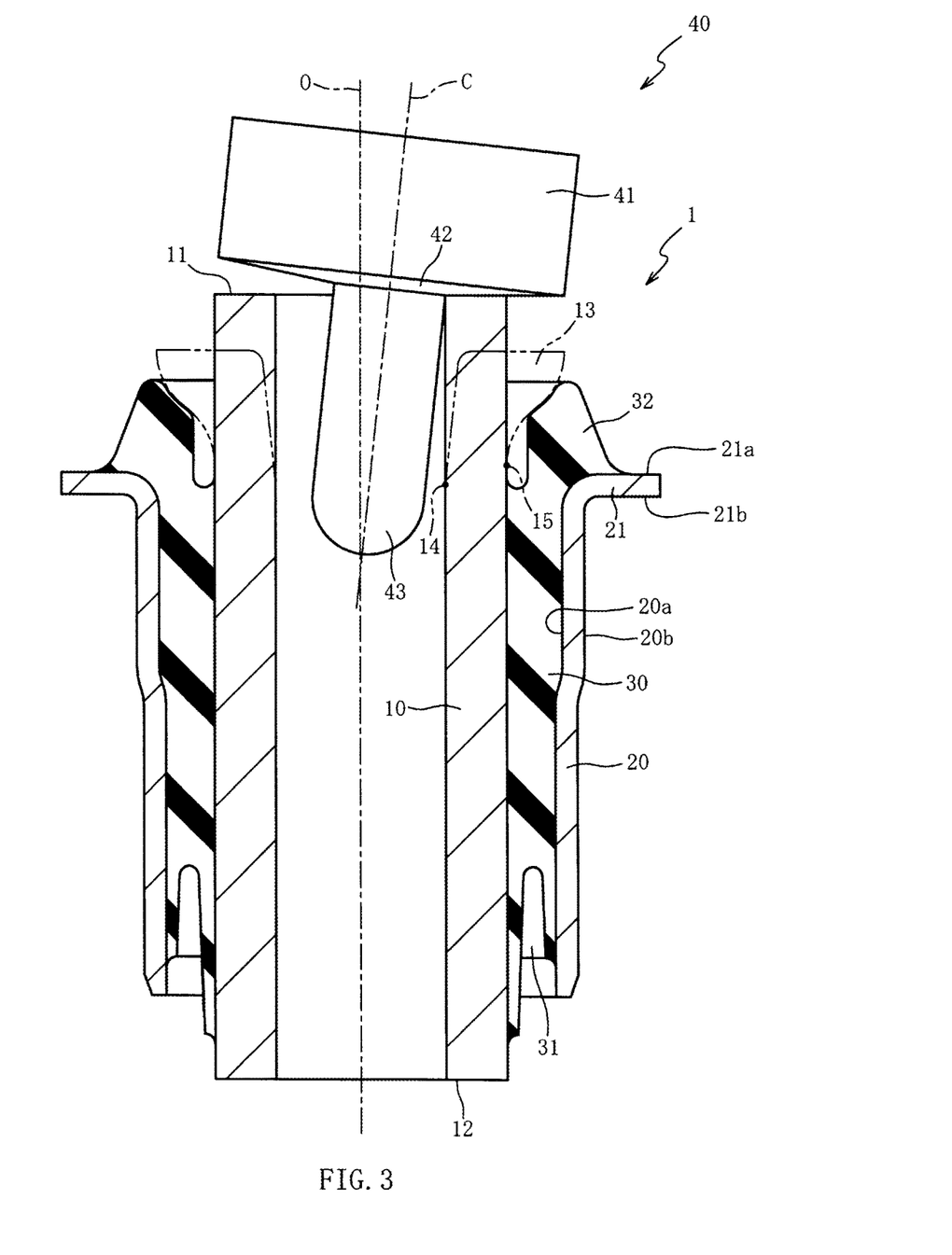
FIG. 3 is a sectional view of the vibration isolation device, in which it is indicated a state that the inner pipe is enlarged.

Next, producing method of the vibration isolation device 1 will be described with reference to FIG. 3. FIG. 3 is a sectional view of the vibration isolation device 1, in which it is indicated a state that the inner pipe 10 is enlarged. First, the inner pipe 10 and the outer pipe 20 are set in a vulcanization-mold (not shown) so that the outer pipe 20 is co-axially positioned with the inner pipe 10 while separating a distance from the outer side of the inner pipe 10 in the radial direction of the inner pipe 10. The end portion of the first end surface 11 side in the inner pipe 10 is fitted in the inner side of cylindrical body of the vulcanization-mold. The vibration isolation body 30 is vulcanized and formed so as to connect the outer peripheral surface of the inner pipe 10, the inner peripheral surface 20a of the outer pipe 20 and the end surface 21a in the axis direction, thereby both the inner pipe 10 and the outer pipe 20 are unified through the vibration isolation body 30

Next, the inner pipe 10, the outer pipe 20 and the vibration isolation body 30 are taken out from the vulcanization-mold. As shown in FIG. 3, in the inner pipe 10 right after taken out from the vulcanization-mold, outlines of the inner peripheral surface and the outer peripheral surface in a sectional plane including the central axis O from the first end surface 11 to the second end surface 12 are straight lines, thus are parallel with the central axis O. Since the parallel surface 34b of the stopper portion 32 is parallel with the central axis O, the outer peripheral surface of the inner pipe 10 and the parallel surface 34b are parallel with each other when taken out from the vulcanization-mold. Therefore, the inner pipe 10, the outer pipe 20 and the vibration isolation body 30 can be easily taken out from the vulcanization-mold. Further, in order that the inner pipe 10 and the stopper portion 32 (vibration isolation body 30) are retained in the non-adhesion state, the first end surface 11 side of the inner pipe 10 is fitted in the cylindrical body (not shown), as a result, a clearance corresponding to the thickness of the cylindrical body occurs between the inner pipe 10 and the stopper portion 32 when taken out from the vulcanization-mold.

Next, the first end surface 11 side of the inner pipe 10 is plastically deformed by using a press tool 40, thereby the enlarged portion 13 is formed. The press tool 40 is a tool made of steel material with high strength than the inner pipe 10 and formed in axis symmetry around a central axis C. In the press tool 40, a conical press surface 42 is formed at one side end of a cylindrical toll body 41 and a protrusion 43 with a circular sectional plane is formed at a center of the press surface 42. The protrusion 43 has a semispherical top and an outer surface to the top is formed parallel with the central axis C.

The protrusion 43 is inserted in the inner pipe 10 from the first end surface 11 side and the press toll 40 is rotated around the center corresponding to the central axis O while pressing the first end surface 11 from the axis direction by the press surface 42 so that the press surface 42 and the first end surface 11 become parallel with each other. Thereby, the first end surface 11 is wholly pressed in the axis direction, as a result, the first end surface 11 side of the inner pipe 10 is plastically deformed. Since the inner peripheral surface of the inner pipe 10 is pressed toward the outer side in the radial direction by the protrusion 43, both the inner peripheral surface and the outer peripheral surface of the inner pipe 10 are enlarged in the radial direction, thus the enlarged portion 13 is formed. Thereby, the clearance between the inner pipe 10 and the stopper portion 32 becomes the space S (see FIG. 1). According to the above producing method of the vibration isolation device 1, the enlarged portion 13 is formed after the vibration isolation body 30 is formed by the vulcanization formation, thus die-out work after vulcanization-formation can be easily done.

When the enlarged portion 13 is formed, a plastic deformation quantity of the inner pipe 10 by the press tool 40 is set so that the outer peripheral starting point 15 from which enlargement of the outer peripheral surface in the inner pipe 10 is started is positioned at first end surface 11 side than a portion where the inner pipe 10 and the vibration isolation body 30 are mutually connected. Thereby, the enlarged portion 13 and the vibration isolation body 30 can be retained in the non-adhesion state.

When the enlarged portion 13 and the vibration isolation body 30 are mutually connected, stress is worked on the adhesion layer of the vibration isolation body 30 when the inner pipe 10 is enlarged, thereby there is fear that cracks occur in the adhesion layer of the vibration isolation body 30. Contrarily, in the embodiment, the enlarged portion 13 and the vibration isolation body 30 retain in the non-adhesion state based on the space S (see FIG. 1), thereby stress working on the adhesion layer of the vibration isolation body 30 when the inner pipe 10 is enlarged can be lowered.

According to the above vibration isolation device 1, the enlarged portion 13 and the stopper portion 32 are contacted when load in the axis direction is added to the inner pipe 10 or the outer pipe 20. Based on that force is added to the stopper portion 32 from the enlarged portion 13, relative deformation in the axis direction of the inner pipe 10 and the outer pipe 20 is restrained. Accordingly, the spring constant in the axis direction can be increased by adding force to the stopper portion 32 from the enlarged portion 13.

In case that the slanted surface 34a is positioned at the second end surface 12 side than the flection portion 21 in the axis direction, since a free length of the stopper portion 32 depends on the distance in the radial direction to the inner peripheral surface 20a of the outer pipe 20 from the slanted surface 34a, the free length of the stopper portion 32 cannot be retained. However, the first embodiment, since the slanted surface 34a is positioned at the first end surface 11 side than the flection portion 21 in the axis direction, the free length of the stopper portion 32 can be retained corresponding to a distance to the slanted surface 34a from the flection portion 21. As a result, soft spring characteristic by the stopper portion 32 can be realized.

Since the stopper portion 32 is extended to the flection portion 21 at the outer side in the radial direction, that is, the stopper portion 32 has the outer side portion 35, the stopper portion 32 can be thickened in the radial direction by the flection portion 21. Further, since the stopper portion 32, to which force is added from the outer peripheral surface with a tapered shape of the enlarged portion 13, can be restrained to deform toward the outer side in the radial direction, therefore it can be restrained that the spring constant in the axis direction is lowered due to that the stopper portion 32 deforms to the outer side in the radial direction. Here, as the stopper portion 32 is set thicker in the radial direction, it can be restrained that the spring constant in the axis direction is lowered.

Since the outer peripheral surface of the outer side portion 35 is enlarged in a tapered shape along the radial direction as the outer peripheral surface is going toward the flection portion 21, the outer side portion 35 can securely catch force added from the enlarged portion 13. Further, since the stopper portion 32 can be made difficult to deform to the outer side in the radial direction, it can be restrained that the spring constant in the axis direction is lowered due to that the stopper portion 32 deforms to the outer side in the radial direction.

Since the space S is formed between the inner pipe 10 and the stopper portion 32, deformation to the inner side in the radial direction of the stopper portion 32 can be permitted by the space S even if force is added to the stopper portion 32 from the enlarged portion 13. Thereby, it can be restrained that the spring constant in the axis direction is lowered due to that the stopper portion 32 deforms to the outer side in the radial direction.

Since the bottom portion 33 is positioned at the second end surface 12 side than the axis direction end surface 21a of the flection portion 21 in the axis direction, the inner side portion 34 of the second end surface 12 side than the axis direction end surface 21a of the flection portion 21 in the axis direction can be easily deformed based on the space S. Since the inner side portion 34 can be more easily deformed than the outer side portion 35 of the stopper portion 32, the stopper portion 32 to which force is added from the enlarged portion 13 can be made difficult to deform to the outer side in the radial direction. As a result, it can be restrained that the spring constant in the axis direction is lowered due to that the stopper portion 32 is deformed to the outer side in the radial direction.

Since the slanted surface 34a is formed into a shape corresponding to the shape of the outer peripheral surface (convex surface 17) in the axis direction of the enlarged portion 13, a pressure reception area of the stopper portion 32 when force is added to the slanted surface 34a can be retained. Further, since a rise in the load-bend curve when load in the axis direction is added to the slanted surface 34a can be made steep, the spring constant in the axis direction can be further increased.

Since force is added to the slanted surface 34a curved in a concave state toward the convex surface 17 from the convex surface 17 curved in a convex state toward the slanted surface 34a, the convex surface 17 and the slanted surface 34a can be made difficult to slip off with each other. As a result, it can be restrained that the spring constant in the axis direction is lowered due to that the convex surface 17 and the slanted surface 34a slip off with each other in the radial direction.

Further, since the connection portion (flection point) of the concave slanted surface 34a and the convex connection surface 34c and the flection point 16 which is the connection portion of the convex surface 17 and the concave surface 18 substantially coincide with each other in the radial direction, the slanted surface 34a and the convex surface 17 can be very closely contacted. Thereby, since the convex surface 17 and the slanted surface 34a can be further made difficult to slip off, it can be further restrained that the spring constant in the axis direction is lowered due to that the convex surface 17 and the slanted surface 34a slip off in the radial direction.

Since a part of the stopper portion 32 is positioned at the inner side in the radial direction than the flection point 16, when force is added to the stopper portion 32 from the enlarged portion 13, the concave surface 18 and both the connection surface 34c and the parallel surface 34b gradually contact while the connection surface 34c and the parallel surface 34b deform into a shape along the concave surface 18 curved in a concave shape. When the concave surface 18 and both the connection surface 34c and parallel surface 34b mutually contact, since the enlarged portion 13 and the stopper portion 32 can be further made difficult to slip off, it can be further restrained that the spring constant is lowered in the axis direction due to that the enlarged portion 13 and the stopper portion 32 slip off in the radial direction.

In case that the inner peripheral surface of the stopper portion 32 is enlarged (parallel surface 34b does not exist) over the axis direction as going toward the first end surface 11, when volume of the stopper portion 32 is retained in order to retain the spring constant in the axis direction, the cylindrical body of the vulcanization-mold, which is fitted to the first end surface 11 side of the inner pipe 10 in the vulcanization formation, becomes thinner as going to the top thereof, thus there is fear that strength of the cylindrical body cannot be retained. Further, contrary to the first embodiment, in case that a part of the inner peripheral surface of the stopper portion 32 protrudes to the inner side in the radial direction (contracted along the radial direction as going to the first end surface 11), a part of the cylindrical body of the vulcanization-mold fitted to the first end surface 11 side of the inner pipe 10 in the vulcanization formation becomes thin. Thus, there is fear that strength of the cylindrical body cannot be retained. On the contrary to the first embodiment, in case that a part of the inner peripheral surface of the stopper portion 32 is recessed to the outer side in the radial direction (contracted along the radial direction as going to the first end surface 11), the spring constant of the stopper portion 32 in the axis direction is lowered.

In contrast, in the first embodiment, since the stopper portion 32 has the parallel surface 34b parallel with the center axis O, thickness of the cylindrical body of the vulcanization-mold fitted to the first end surface 11 side of the inner pipe 10 in the vulcanization formation can be retained while retaining the spring constant of the stopper portion 32 in the axis direction. Therefore, strength of the cylindrical body of the vulcanization-mold can be retained while retaining the spring constant of the stopper portion 32 in the axis direction.

Since the slanted surface 34a is positioned at the outer side in the radial direction of the enlarged portion 13 under the non-load state, the stopper portion 32 and the enlarged portion 13 can be brought close with each other. As a result, a relative displacement quantity of the inner pipe 10 and the outer pipe 20 in the axis direction can be reduced and a relative displacement in both the radial direction of the inner pipe 10 and the outer pipe 20 and a pry direction can be restrained.

Since the enlarged portion 13 is protruded toward the outer side in the radial direction than the inner peripheral surface 20a of the outer pipe 20, that is, the enlarged portion 13 and the outer pipe 20 are superimposed when seen from the axis direction. Thereby, when relatively large load is added to the stopper portion 32 from the enlarged portion 13, relative displacement of the inner pipe 10 and the outer pipe 20 in the axis direction can be securely restrained through the stopper portion 32 at a part of which the enlarged portion 13 and the outer pipe 20 are superimposed in the axis direction.

Next, a second embodiment will be described with reference to FIG. 4. In the first embodiment, it is described a case that the inner peripheral surface of the stopper portion 32 is constructed from a part parallel with the central axis O and a part enlarged in a tapered shape along the radial direction toward the first end surface 11. On the contrary, in the second embodiment, it will be described a case that a part of the inner peripheral surface of the stopper portion 52 has a recess portion 53 recessed toward the outer side in the radial direction. Here, as for the same elements and members in the first embodiment, the same references are attached thereto and explanation thereof will be omitted.

Figure 4:
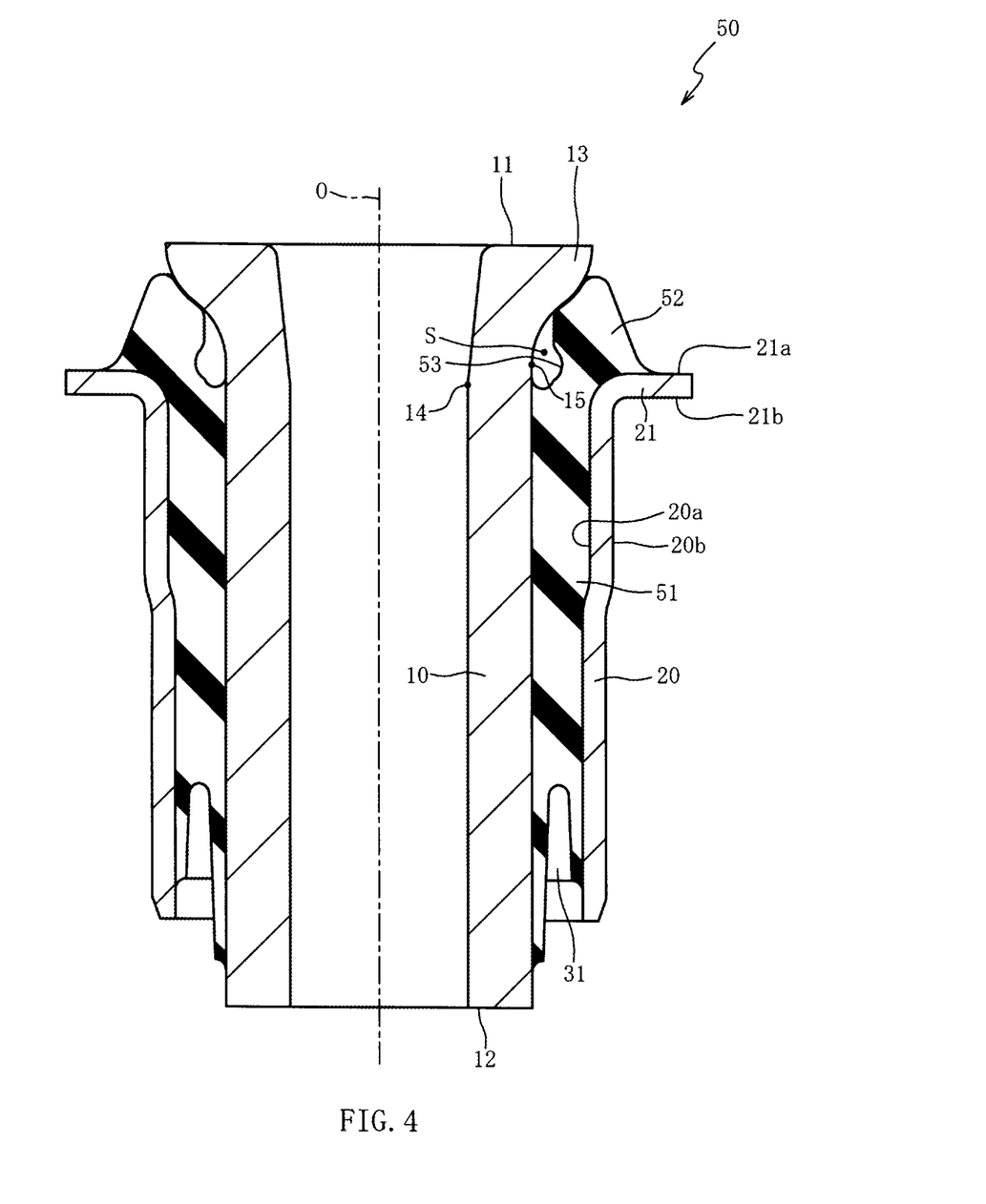
FIG. 4 is a sectional view of the vibration isolation device according to a second embodiment.

FIG. 4 is a sectional view of the vibration isolation device 50 according to the second embodiment. As shown in FIG. 4, the vibration isolation device 50 has the inner pipe 10, the outer pipe 20 coaxially arranged so as to separate from an outer side in a radial direction of the inner pipe 10 with a distance therebetween and a vibration isolation body 51 made of rubber elastic material which connects the inner pipe 10 and the outer pipe 20.

The vibration isolation body 51 is a substantially cylindrical member provided between the inner pipe 10 and the outer pipe 20. In the second embodiment, the vibration isolation body 51 is formed by vulcanization formation of rubber material. The inner peripheral surface of the vibration isolation body 51 is adhered to the second end surface 12 side than the outer peripheral starting point 15 in the outer peripheral surface of the inner pipe 10 by vulcanization-adhesion and the outer peripheral surface of the vibration isolation body 51 is adhered to the inner peripheral surface 20a of the outer pipe 20 and the axis direction end surface 21a of the flection portion 21 by vulcanization-adhesion.

In the vibration isolation body 51, it is provided an annular stopper portion 52 protruded between the inner pipe 10 and the outer pipe 20 and toward the enlarged portion 13 from the flection portion 21. The stopper portion 52 is a part which restrains relative displacement of the inner pipe 10 and the outer pipe 20 in the axis direction by adding force from the enlarged portion 13. The stopper portion 52 is arranged so that a predetermined space S is provided in a clearance to the inner pipe 10 under non-load state.

The stopper portion 52 has a recess portion 53 on the inner peripheral surface thereof, the recess portion 53 being recessed toward the outer side in the radial direction. The recess portion 53 is formed so as to do one lap around the inner peripheral surface of the stopper portion 52 at the position facing the outer peripheral surface of the inner pipe 10 with the space S therebetween. In case that the vibration isolation device 50 is taken out from the vulcanization-mold, since a part of the vulcanization-mold is entered in the recess portion 53, the vibration isolation device 50 is taken out from the vulcanization-mold while elastically deforming the stopper portion 52. Thus, depth of the recess portion 53 (dimension in the radial direction) is set so that the vibration isolation device 50 is easily taken out from the vulcanization-mold.

Since the spring constant in the axis direction of the stopper portion 52 of a part where the recess portion 53 is formed is reduced, it can be realized that the stopper portion 52 to which force is added from the enlarged portion 13 is made difficult to deform to the outer side in the radial direction based on the recess portion 53. Thereby, it can be restrained that spring constant in the axis direction is lowered due to that the stopper portion 52 is deformed to the outer side in the radial direction. Here, as depth of the recess portion 53 is set larger, the stopper portion 52 can be made difficult to deform to the outer side in the radial direction, therefore it can be further restrained that the spring constant in the axis direction is lowered due to that the stopper portion 52 is deformed to the outer side in the radial direction.

Since a rigid body to restrain deformation of the stopper portion 52 to the outer side in the radial direction does not exist in the stopper portion 52 corresponding to a part protruded to the first end surface 11 side than the flection portion 21 in the axis direction, the stopper portion 52 is easy to deform to the outer side in the radial direction. However, since at least a part of the recess portion 53 is formed to the first end surface 11 side than the flection portion 21 in the axis direction, the stopper portion 52 can be made difficult to deform to the outer side in the radial direction based on the recess portion 53. As a result, it can be further restrained that the spring constant in the axis direction is lowered due to that the stopper portion 52 deforms to the outer side in the radial direction.

Since the recess portion 53 is formed near the second end surface 12 of the stopper portion 52, the stopper portion 52 elastically deforming by force added to the stopper portion 52 from the enlarged portion 13 can be sneaked around in the space S of the first end surface 11 side than the recess portion 53 in the axis direction. Since the stopper portion 52 can be made difficult to deform to the outer side in the radial direction by the recess portion 53 and the space S can be made small by the sneaked stopper portion 52, the spring constant in the axis direction can be improved while restraining that the spring constant in the axis direction is lowered due to that the stopper portion 52 deforms to the outer side in the radial direction.

In the above, although the present invention is described based on the embodiments, the present invention is not limited to the above embodiments and it will be easily guessed that various improvements and modifications can be done within the scope of the present invention. For example, shapes of the inner pipe 10, the outer pipe 20, the vibration isolation body 30, 51 and the press tool 40 respectively show one example and various shapes thereof can be adopted.

In each of the embodiments, although it is described the case that the vibration isolation device 1, 50 is adopted to the suspension device in a car, it is not necessarily limited to this case. For example, it can be naturally done that the vibration isolation device is adopted to various uses each of which is demanded to restrain the relative displacement in the axis direction while restraining vibration transmission. Further, in addition to uses for a car, the vibration isolation device according to the present invention can be naturally adopted to various industrial apparatuses.

In each of the embodiments, although it is described the case that the enlarged portion 13 is formed at the first end surface 11 side of the inner pipe 10, it is not necessarily limited to this case. In addition to the enlarged portion 13 at the first end surface 11 side, the enlarged portion which is further enlarged as going to the second end surface 12 can be naturally formed at the second end surface 12 side of the inner pipe 10. Thereby, since the area of the second end surface 12 can be enlarged, surface pressure received by the second end surface 12 due to fastening to the partner member can be made small. As a result, cave-in of the partner member or buckle at the first end surface 11 side of the inner pipe 10 can be restrained.

In each of the embodiments, although it is described the case that the inner peripheral surface and the outer peripheral surface of the enlarged portion 13 is enlarged in a tapered shape as going to the first end surface 11, it is not necessarily limited to this case. It is conceivable a case that the outer peripheral surface of the enlarged portion 13 is enlarged in a tapered shape and a shape of the inner peripheral surface of the enlarged portion 13 may be voluntarily set. For example, the inner peripheral surface of the enlarged portion 13 is set so as to contract along the radial direction as going to the first end surface 11, thereby the area of the first end surface 11 can be further enlarged.

Furthermore, the outer peripheral surface of the enlarged portion 13 is not limited to the shape with the flection point 16 and the outline in the sectional plane including the central axis O can be made to a shape of straight line, convex, concave, combination of plurality of straight line, convex and concave. At that time, the slanted surface 34a can be formed to straight line or convex corresponding to the shape of the outer peripheral surface of the enlarged portion 13 in the axis direction.

In each of the embodiments, although it is described the case that force is added from the enlarged portion 13 to the slanted surface 34a formed in a shape corresponding to the shape of the outer peripheral surface of the enlarged portion 13 in the axis direction, it is not necessarily limited to this case. It is not necessary that the surface shape of the stopper portion 32, 52 to which force is added from the enlarged portion 13 corresponds to the enlarged portion 13. In this case, since the enlarged portion 13 enlarged in a tapered shape along the radial direction and the stopper portion 32, 52 smoothly contact according to relative displacement of the inner pipe 10 and the outer pipe 20, the load-bend curve in the axis direction can be gently raised.

In each of the embodiments, although it is described the case that the flection portion 21 is formed in the outer pipe 20, it is not necessarily limited to this case. The flection portion 21 can be naturally omitted. Further, it is not limited to the case that the flection portion 21 is bent at substantially right angle against the central axis O toward the outer side in the radial direction, and it is conceivable that the flection portion 21 is slanted toward the enlarged portion 13 within a range of 0° to 60° from the state that the flection portion 21 is bent at substantially right angle against the central axis O toward the outer side in the radial direction. In this case, since deformation to the outer side in the radial direction of the stopper portion 32, 52 can be restrained by the flection portion 21, it can be restrained that the stopper portion 32, 52 deforms to the outer side in the radial direction and the spring constant in the axis direction is lowered.

The invention claimed is:

1. A vibration isolation device comprising:
an inner pipe having a first end surface and a second end surface at respective ends in an axis direction, the inner pipe having an enlarged portion enlarged in a tapered shape as going to the first end surface;
an outer pipe arranged at an outer side in a radial direction of the inner pipe with a distance therebetween;
a vibration isolation body made of elastic material and connecting the inner pipe and the outer pipe, the vibration isolation body being retained in a non-adhesion state from the enlarged portion; and
a flection portion formed in the outer pipe by bending an end portion in the axis direction at a side of the enlarged portion toward the outer side in a radial direction;
wherein the vibration isolation body has a stopper portion protruded toward the enlarged portion from a clearance between the inner pipe and the outer pipe and the flection portion and restraining a relative displacement of the inner pipe and the outer pipe in the axis direction by adding force from the enlarged portion at the first end surface side than the flection portion in the axis direction,
wherein the enlarged portion is a portion constituted by plastic-deforming a part of the inner pipe such that an outer peripheral surface of the inner pipe located on a first end surface side of an outer peripheral starting point of the inner pipe is enlarged in a tapered shape, and
wherein the vibration isolation body is in the non-adhesion state with the outer peripheral surface of the inner pipe located on the first end surface side of the outer peripheral starting point of the inner pipe, wherein the outer peripheral starting point is a point of the outer peripheral surface of the inner pipe at which enlargement of the outer peripheral surface starts, wherein the outer peripheral surface of the inner pipe is parallel to an axis of the inner pipe at a section located on a second end surface side of the outer peripheral starting point, wherein the inner pipe including the enlarged portion is made by one-piece member, and wherein the outer peripheral starting point is an end point of the section in which the outer peripheral surface of the inner pipe is parallel to the axis of the inner pipe such that the outer peripheral surface of the inner pipe parallel to the axis of the inner pipe starts at the outer Peripheral starting point.

2. The vibration isolation device according to claim 1, wherein a part of the stopper portion to which force is added from the enlarged portion is positioned at the outer side in the radial direction of the enlarged portion under anon-load state.

3. The vibration isolation device according to claim 1, wherein the stopper portion has a recess portion arranged at a position facing an outer peripheral surface of the inner pipe and recessed toward the outer side in the radial direction of the inner pipe.

4. The vibration isolation device according to claim 3, wherein at least a part of the recess portion is arranged at the first end surface side than the flection portion in the axis direction.

5. The vibration isolation device according to claim 1, wherein the enlarged portion is superimposed with the outer pipe when seen from the axis direction.

6. The vibration isolation device according to claim 1, wherein a part of the stopper portion positioned at the outer side in the radial direction with respect to an inner peripheral surface of the outer pipe is defined as an outer side portion, and wherein the outer side portion is enlarged in a tapered shape along the radial direction as the outer peripheral surface of the outer side portion extends toward the flection portion.

7. The vibration isolation device according to claim 1, wherein a predetermined space is formed between the inner pipe and the stopper portion under the non-load state.

8. The vibration isolation device according to claim 7, wherein the predetermined space includes a bottom portion at a second end surface side of the predetermined space, and the flection portion includes an axis direction end surface at a first end surface side of the flection portion, and the bottom portion is positioned closer to the second end surface side than the axis direction end surface of the flection portion in the axis direction.

9. The vibration isolation device according to claim 1, wherein the stopper portion has a slanted surface corresponding to a surface to which force is added from the enlarged portion and formed into a shape corresponding to the outer peripheral surface in the axis direction of the enlarged portion.

10. The vibration isolation device according to claim 9, wherein the enlarged portion has a convex surface formed so that the outer peripheral surface in the axis direction is curved in a convex shape toward the slanted surface, and wherein the slanted surface is curved in a concave shape toward the convex surface.

11. The vibration isolation device according to claim 10, wherein the enlarged portion has a concave surface formed so that the outer peripheral surface is curved in a concave shape continuous to the second end surface side of the convex surface, and wherein a part of the stopper portion is positioned at an inner side in the radial direction than a flection point which is a border of the convex surface and the concave surface.

12. The vibration isolation device according to claim 10, wherein the enlarged portion has a concave surface formed so that the outer peripheral surface is curved in a concave shape continuous to the second end surface side of the convex surface, wherein the stopper portion has a connection surface formed so that the inner peripheral surface is curved in a convex shape continuous to the second end surface side of the slanted surface, and wherein a position of the flection point of the convex surface and the concave surface and a position of the flection point of the slanted surface and the connection surface coincide in the radial direction.

13. A vibration isolation device comprising:

an inner pipe having a first end surface and a second end surface at respective ends in an axis direction, the inner pipe having an enlarged portion enlarged in a tapered shape as going to the first end surface;

an outer pipe arranged at an outer side in a radial direction of the inner pipe with a distance therebetween;

a vibration isolation body made of elastic material and connecting the inner pipe and the outer pipe, the vibration isolation body being retained in a non-adhesion state from the enlarged portion; and a flection portion formed in the outer pipe by bending an end portion in the axis direction at a side of the enlarged portion toward the outer side in a radial direction;

wherein the vibration isolation body has a stopper portion protruded toward the enlarged portion from a clearance between the inner pipe and the outer pipe and the flection portion and restraining a relative displacement of the inner pipe and the outer pipe in the axis direction by adding force from the enlarged portion at the first end surface side than the flection portion in the axis direction, wherein the stopper portion has a slanted surface corresponding to a surface to which force is added from the enlarged portion and formed into a shape corresponding to the outer peripheral surface in the axis direction of the enlarged portion, wherein the enlarged portion has a convex surface formed so that the outer peripheral surface in the axis direction is curved in a convex shape toward the slanted surface, wherein the slanted surface is curved in a concave shape toward the convex surface, wherein the enlarged portion has a concave surface formed so that the outer peripheral surface is curved in a concave shape continuous to the second end surface side of the convex surface, and wherein a part of the stopper portion is positioned at an inner side in the radial direction than a flection point which is a border of the convex surface and the concave surface.

14. A vibration isolation device comprising:

an inner pipe having a first end surface and a second end surface at respective ends in an axis direction, the inner pipe having an enlarged portion enlarged in a tapered shape as going to the first end surface;

an outer pipe arranged at an outer side in a radial direction of the inner pipe with a distance therebetween;

a vibration isolation body made of elastic material and connecting the inner pipe and the outer pipe, the vibration isolation body being retained in a non-adhesion state from the enlarged portion; and a flection portion formed in the outer pipe by bending an end portion in the axis direction at a side of the enlarged portion toward the outer side in a radial direction;

wherein the vibration isolation body has a stopper portion protruded toward the enlarged portion from a clearance between the inner pipe and the outer pipe and the flection portion and restraining a relative displacement of the inner pipe and the outer pipe in the axis direction by adding force from the enlarged portion at the first end surface side than the flection portion in the axis direction, wherein the stopper portion has a slanted surface corresponding to a surface to which force is added from the enlarged portion and formed into a shape corresponding to the outer peripheral surface in the axis direction of the enlarged portion, wherein the enlarged portion has a convex surface formed so that the outer peripheral surface in the axis direction is curved in a convex shape toward the slanted surface, wherein the slanted surface is curved in a concave shape toward the convex surface, wherein the enlarged portion has a concave surface formed so that the outer peripheral surface is curved in a concave shape continuous to the second end surface side of the convex surface, wherein the stopper portion has a connection surface formed so that the inner peripheral surface is curved in a convex shape continuous to the second end surface side of the slanted surface, and wherein a position of the flection point of the convex surface and the concave surface and a position of the flection point of the slanted surface and the connection surface coincide in the radial direction.

* * * * *